US010382699B2

(12) United States Patent
Rainisto et al.

(10) Patent No.: US 10,382,699 B2
(45) Date of Patent: Aug. 13, 2019

(54) IMAGING SYSTEM AND METHOD OF PRODUCING IMAGES FOR DISPLAY APPARATUS

(71) Applicant: Varjo Technologies Oy, Helsinki (FI)

(72) Inventors: Roope Rainisto, Helsinki (FI); Klaus Melakari, Oulu (FI)

(73) Assignee: Varjo Technologies Oy, Helsinki (FI)

( * ) Notice: Subject to any disclaimer, the term of this patent is extended or adjusted under 35 U.S.C. 154(b) by 2 days.

(21) Appl. No.: 15/643,574

(22) Filed: Jul. 7, 2017

(65) Prior Publication Data
US 2018/0160048 A1    Jun. 7, 2018

Related U.S. Application Data

(63) Continuation-in-part of application No. 15/366,424, filed on Dec. 1, 2016, now Pat. No. 9,711,072.

(51) Int. Cl.
*G09G 1/00* (2006.01)
*H04N 5/232* (2006.01)
(Continued)

(52) U.S. Cl.
CPC ..... *H04N 5/23296* (2013.01); *G02B 27/0093* (2013.01); *G02B 27/0172* (2013.01);
(Continued)

(58) Field of Classification Search
CPC ... G06T 5/00; G06T 3/40; G06T 15/20; G06F 3/01
See application file for complete search history.

(56) References Cited

U.S. PATENT DOCUMENTS

2004/0227699 A1    11/2004 Mitchell et al.
2013/0300635 A1*   11/2013 White ................ H04N 13/383
                                                        345/7
(Continued)

FOREIGN PATENT DOCUMENTS

WO    20160130941 A1    8/2004
WO    20105094191 A1    6/2015

OTHER PUBLICATIONS

International Search Report and Written Opinion of the International Searching Authority received for International Application No. PCT/FI2017/050827, dated Mar. 6, 2018, 13 pages.

*Primary Examiner* — Michael A Faragalla
(74) *Attorney, Agent, or Firm* — Ziegler IP Law Group, LLC

(57) ABSTRACT

An imaging system and a method of producing images for a display apparatus, via the imaging system includes at least one focusable camera for capturing at least one image of a given real-world scene; means for generating a depth map or a voxel map of the given real-world scene; and a processor coupled to the focusable camera and the aforesaid means. The processor is communicably coupled with the display apparatus. The processor is configured to receive information of the gaze direction of the user; map the gaze direction to the depth map or the voxel map to determine an optical depth of a region of interest in the given real-world scene; and control the focusable camera to employ a focus length that is substantially similar to the determined optical depth of the region of interest when capturing the at least one image.

7 Claims, 2 Drawing Sheets

(51) Int. Cl.
*H04N 13/271* (2018.01)
*G06F 3/01* (2006.01)
*G06T 5/00* (2006.01)
*G02B 27/01* (2006.01)
*G02B 27/00* (2006.01)

(52) U.S. Cl.
CPC .............. *G06F 3/013* (2013.01); *G06T 5/003* (2013.01); *H04N 13/271* (2018.05); *G02B 2027/0138* (2013.01); *G02B 2027/0147* (2013.01); *G02B 2027/0154* (2013.01); *G06T 2207/10028* (2013.01); *G06T 2207/20221* (2013.01)

(56) References Cited

U.S. PATENT DOCUMENTS

| | | | |
|---|---|---|---|
| 2013/0341493 A1* | 12/2013 | Ando | G01C 3/32 250/208.1 |
| 2015/0003819 A1 | 1/2015 | Ackerman et al. | |

* cited by examiner

IMAGING SYSTEM AND METHOD OF PRODUCING IMAGES FOR DISPLAY APPARATUS

CROSS-REFERENCE TO RELATED APPLICATIONS

This application is a continuation-in-part of U.S. patent application Ser. No. 15/366,424, titled "DISPLAY APPARATUS AND METHOD OF DISPLAYING USING FOCUS AND CONTEXT DISPLAYS" and filed on Dec. 1, 2016, the disclosure of which is incorporated herein by reference in its entirety.

TECHNICAL FIELD

The present disclosure relates generally to representation of visual information; and more specifically, to imaging systems comprising focusable cameras, means for generating depth maps or voxels maps, and processors. Furthermore, the present disclosure also relates to methods of producing images for display apparatuses via the aforementioned imaging systems.

BACKGROUND

In recent times, there have been rapid advancements in development and use of technologies such as virtual reality, augmented reality, and so forth, for presenting a simulated environment to a user. Specifically, such technologies provide the user with a feeling of complete involvement (namely, immersion) within the simulated environment by employing contemporary techniques such as stereoscopy. Therefore, such simulated environments provide the user with an enhanced perception of reality around him/her. Moreover, such simulated environments relate to fully virtual environments (namely, virtual reality) as well as real world environments including virtual objects therein (namely, augmented reality).

Typically, the user may use a specialized device, for example, such as a virtual reality device or an augmented reality device, for experiencing such simulated environments. Generally, the virtual and augmented reality devices are binocular devices having separate display optics for each eye of the user. Furthermore, images that are employed to present such simulated environments are captured by suitable imaging equipment, and are communicated therefrom, to the specialized device. Examples of the virtual reality devices include, head mounted virtual reality devices, virtual reality glasses, and so forth. Furthermore, examples of the augmented reality devices include augmented reality headsets, augmented reality glasses, and so forth.

However, conventional imaging equipment has certain limitations. Firstly, the existing imaging equipment employing fixed focus cameras is unable to achieve high resolution within captured images of a scene having sufficiently deep depth characteristics. However, the specialized devices often require high resolution images in order to accurately provide the user with an experience of depth within the simulated environment. Therefore, such imaging equipment employing fixed focus cameras is limited in its capability to provide requisite high resolution images to the specialized devices. Secondly, the existing imaging equipment employing auto focus cameras requires significant processing power and processing time to adjust focus within the scene, and often interfere with focusing properties of eyes of the user. Thirdly, in conventional imaging equipment, employing small aperture of the cameras to enhance depth of field within the captured images, also reduces amount of light incident on imaging sensors of such cameras. Consequently, the captured images using such imaging equipment have poor resolution and noise.

Therefore, in light of the foregoing discussion, there exists a need to overcome the aforementioned drawbacks associated with conventional imaging equipment associated with the virtual and augmented reality devices.

SUMMARY

The present disclosure seeks to provide an imaging system. The present disclosure also seeks to provide a method of producing images for a display apparatus, via such an imaging system. The present disclosure seeks to provide a solution to the existing problem of low resolution, poor depth representation and noise within images captured by conventional imaging equipment. An aim of the present disclosure is to provide a solution that overcomes at least partially the problems encountered in the prior art, and provides a robust, reliable and efficient imaging system for use with the display apparatus.

In one aspect, an embodiment of the present disclosure provides an imaging system comprising:
- at least one focusable camera for capturing at least one image of a given real-world scene;
- means for generating a depth map or a voxel map of the given real-world scene; and
- a processor coupled to the at least one focusable camera and the means for generating the depth map or the voxel map, wherein the processor is arranged to be communicably coupled with a display apparatus, the display apparatus comprising means for tracking a gaze direction of a user, further wherein the processor is configured to:
- receive, from the display apparatus, information indicative of the gaze direction of the user;
- map the gaze direction of the user to the depth map or the voxel map to determine an optical depth of a region of interest in the given real-world scene; and
- control the at least one focusable camera to employ a focus length that is substantially similar to the determined optical depth of the region of interest when capturing the at least one image of the given real-world scene.

In another aspect, an embodiment of the present disclosure provides a method of producing images for a display apparatus, via an imaging system comprising at least one focusable camera and means for generating a depth map or a voxel map of a given real-world scene, the imaging system being communicably coupled with the display apparatus, the method comprising:
- generating the depth map or the voxel map of the given real-world scene;
- receiving, from the display apparatus, information indicative of a gaze direction of a user;
- mapping the gaze direction of the user to the depth map or the voxel map to determine an optical depth of a region of interest in the given real-world scene; and
- controlling the at least one focusable camera to employ a focus length that is substantially similar to the determined optical depth of the region of interest to capture at least one image of the given real-world scene.

Embodiments of the present disclosure substantially eliminate or at least partially address the aforementioned problems in the prior art, and enables enhancement of resolution and depth characteristics within the images captured by the imaging system described herein whilst minimising noise in the captured images.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
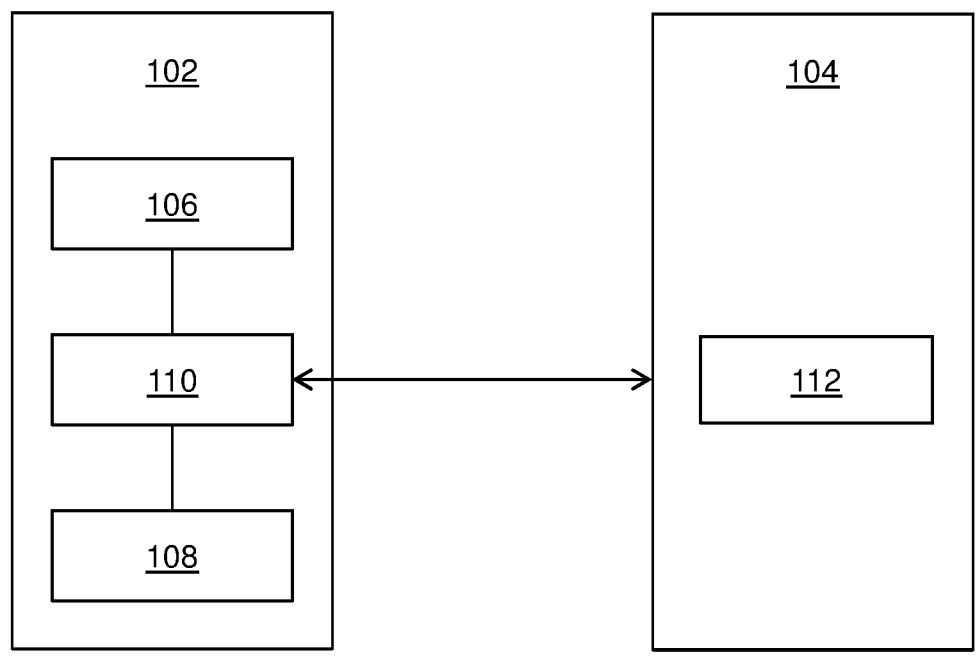
FIGS. 1 and 2 are block diagrams of architectures of an imaging system and a display apparatus, in accordance with different embodiments of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides an imaging system comprising:
at least one focusable camera for capturing at least one image of a given real-world scene;
means for generating a depth map or a voxel map of the given real-world scene; and
a processor coupled to the at least one focusable camera and the means for generating the depth map or the voxel map, wherein the processor is arranged to be communicably coupled with a display apparatus, the display apparatus comprising means for tracking a gaze direction of a user,
further wherein the processor is configured to:
receive, from the display apparatus, information indicative of the gaze direction of the user;
map the gaze direction of the user to the depth map or the voxel map to determine an optical depth of a region of interest in the given real-world scene; and
control the at least one focusable camera to employ a focus length that is substantially similar to the determined optical depth of the region of interest when capturing the at least one image of the given real-world scene.

In another aspect, an embodiment of the present disclosure provides a method of producing images for a display apparatus, via an imaging system comprising at least one focusable camera and means for generating a depth map or a voxel map of a given real-world scene, the imaging system being communicably coupled with the display apparatus, the method comprising:
generating the depth map or the voxel map of the given real-world scene;
receiving, from the display apparatus, information indicative of a gaze direction of a user;
mapping the gaze direction of the user to the depth map or the voxel map to determine an optical depth of a region of interest in the given real-world scene; and
controlling the at least one focusable camera to employ a focus length that is substantially similar to the determined optical depth of the region of interest to capture at least one image of the given real-world scene.

The present disclosure provides the aforementioned imaging system and the aforementioned method of producing images for the display apparatus, via such an imaging system. The imaging system described herein achieves high resolution within captured images of scenes having sufficiently deep depth characteristics. Furthermore, processing power and processing time required by the imaging system is significantly less as compared to conventional imaging equipment. Therefore, such an imaging system can be implemented without interfering with focusing properties of eyes of a user. Furthermore, the captured images using the imaging system described herein accurately represent depth of field within the captured noise with minimal noise. Therefore, such an imaging system allows for the display apparatus associated therewith, to closely emulate focusing properties of human visual system therein.

Throughout the present disclosure, the term "imaging system" used herein relates to equipment configured to produce the images for the display apparatus. It will be appreciated that the images produced by the imaging system described herein, are employed to present a simulated environment (for example, such as a virtual reality environment, an augmented reality environment, and the like) to the user of the display apparatus, when the display apparatus is worn by the user. In such an instance, the display apparatus is operable to act as a device (for example, such as a virtual reality headset, a pair of virtual reality glasses, an augmented reality headset, a pair of augmented reality glasses, and the like) for presenting the simulated environment to the user.

In an embodiment, the imaging system is integrated with the display apparatus. In such an instance, the imaging system is implemented on (namely, mounted on) the display apparatus. Furthermore, in this regard, the at least one focusable camera may be mounted, for example, on an outer surface of the display apparatus, such that the at least one focusable camera faces the given real-world scene. Moreover, in such an instance, the processor and the means for generating the depth map or the voxel map may be mounted, for example, on an inner surface of the display apparatus. Therefore, in such an implementation, the processor may be communicably coupled with the display apparatus by way of wires (namely, in a wired manner). Alternatively, the processor may be communicably coupled with the display apparatus wirelessly (namely, via a wireless interface).

In another embodiment, the imaging system is integrated with a remote device. In such an instance, the at least one focusable camera, the means for generating the depth map or the voxel map, and the processor are mounted on the remote device, and are therefore external to the display apparatus. Furthermore, in such an implementation, the remote device may be positioned within the given real-world scene whereas the user of the display apparatus may be positioned away from (namely, at a distance from) the remote device. Therefore, in such an implementation, the processor may be communicably coupled with the display apparatus wirelessly (namely, via a wireless interface). Optionally, the remote device is one of: a drone, a robot.

Furthermore, throughout the present disclosure, the term "at least one focusable camera" relates to equipment that is operable to detect and process light from the given real-world scene to capture the at least one image of the given real-world scene. It will be appreciated that the term "at least one focusable camera" relates to "one focusable camera" in one example, and "a plurality of focusable cameras" in another example. Moreover, it will be appreciated that the at least one image of the given real world scene may be captured from a same perspective or from different perspectives. Optionally, the at least one focusable camera comprises at least one controllable lens and an imaging sensor, wherein the at least one controllable lens is configured to direct light from the given real-world scene onto a photosensitive surface of the imaging sensor to capture the at least one image of the given real-world scene. In such an instance, the at least one controllable lens substantially passes the light from the given real-world scene therethrough, towards the imaging sensor. Furthermore, the at least one controllable lens is arranged to allow for converging and/or diverging the light from the given real-world scene, as desired, to focus said light onto the photosensitive surface of the imaging sensor. Moreover, in such an instance, the processor coupled to the at least one focusable camera is configured to control operative properties (for example, such as aperture, focus length, and the like) of the at least one controllable lens.

Throughout the present disclosure, the term "controllable lens" used herein relates to a lens that is controllable for adjustment of the operative properties associated therewith. Examples of the at least one controllable lens include, but are not limited to, a convex lens, a concave lens, a plano-convex lens, a plano-concave lens, a Liquid Crystal (LC) lens, and a liquid lens.

Optionally, the at least one focusable camera comprises a first focusable camera substantially aligned with a left eye of the user and a second focusable camera substantially aligned with a right eye of the user. In such an instance, the first focusable camera is configured to capture at least one image of the given real-world scene from a left perspective view of the user whereas the second focusable camera is configured to capture at least one image of the given real-world scene from a left perspective view of the user. Hereinafter, the at least one image of the given real-world scene captured by the first focusable camera is referred to as "at least one left perspective image", for sake of convenience and clarity. Similarly, the at least one image of the given real-world scene captured by the second focusable camera is referred to as "at least one right perspective image". Therefore, it will be appreciated that the at least one left perspective image and the at least one right perspective image collectively constitute the at least one image of the given real-world scene upon combination thereof. Optionally, in this regard, the imaging system comprises at least one optical element for combining the at least one left perspective image and the at least one right perspective image to create the at least one image of the given real-world scene. Examples of the at least one optical element include, but are not limited to, a semi-transparent mirror, a semi-transparent film, a prism, a polarizer, a lens, an optical waveguide.

Optionally, the imaging system comprises at least one first actuator for moving the at least one focusable camera with respect to the eyes of the user. In such an instance, the processor is configured to control the at least one first actuator for moving the at least one focusable camera. It will be appreciated that the at least one focusable camera is moved to capture the at least one image of the given real world scene from at least one perspective. Beneficially, such movement of the at least one focusable camera may also be utilized in an event of a change in the gaze direction of the user. More optionally, such movement includes at least one of: displacement (horizontally and/or vertically), rotation and/or tilting of the at least one focusable camera.

In an example, the imaging system may comprise one focusable camera C1 for capturing the at least one image of the given real-world scene. In such an example, the processor may control the at least one first actuator to displace the focusable camera C1 horizontally, to capture to images of the given real-world scene from the left and right perspective views of the user.

In another example, the imaging system may comprise a first focusable camera FC substantially aligned with the left eye of the user and a second focusable camera SC substantially aligned with the right eye of the user. In such an example, the processor may control the at least one first actuator to displace the first focusable camera FC and the second focusable camera SC horizontally, to move the aforesaid cameras FC and SC closer or away from the eyes of the user.

Throughout the present disclosure, the term "means for generating the depth map or the voxel map" relates to equipment and/or techniques configured to record and represent optical depth (namely, optical distance) of at least one object within the given real-world scene. Optionally, the means for generating the depth map or the voxel map comprises an imaging device configured to capture an image of the given real-world scene to generate the depth map or the voxel map of the given real-world scene. Optionally, in this regard, the image captured by the imaging device is a two-dimensional image or a three-dimensional image. Moreover, the captured image of the given real-world scene may require further processing to accurately represent the optical depth of the at least one object within the given real-world scene. Furthermore, it will be appreciated that the imaging device could be a two-dimensional camera or a depth camera (namely, a ranging camera). Examples of the imaging device include, but are not limited to, a digital camera, an RGB-D camera, a Light Detection and Ranging (LiDAR) camera, a Time-of-Flight (ToF) camera, a Sound Navigation and Ranging (SONAR) camera, a laser rangefinder, a stereo camera, a plenoptic camera, an infrared camera, and an ultrasound imaging equipment.

Additionally, optionally, the means for generating the depth map or the voxel map comprises a processing module coupled to the imaging device, wherein the processing module is configured to process the captured image of the given real-world scene for generating the depth map or the voxel map of the given real-world scene. In an example, the imaging device may be a stereo camera configured to capture a three-dimensional image of the given real-world scene. In such an instance, the processing module coupled to the stereo camera may process the captured three-dimensional image to create a disparity map that may be employed to generate the depth map or the voxel map of the given real-world scene. In another example, the means for generating the depth map or the voxel map may be implemented on a surveying device, wherein the surveying device may be arranged to move within the real world scene for (i) capturing the image of the given real-world scene using the imaging device, and (ii) employing Simultaneous Localization and Mapping (SLAM) algorithm to process the captured image of the given real-world scene for generating the depth map or the voxel map of the given real-world scene.

Furthermore, throughout the present disclosure, the term "optical depth" relates to distance between the at least one object within the given real-world scene and an imaging equipment employed to capture the image of the given real-world scene. It will be appreciated that the image of the given real-world scene is captured optionally, by the aforesaid imaging device (of the means for generating the depth map or the voxel map). Therefore, in such an instance, the term "optical depth" relates to distance between the at least one object within the given real-world scene and the imaging device employed to capture the image of the given real-world scene. As an example, a distance between an object O1 within the given real-world scene and the imaging device may be 5 meters. In such an example, an optical depth of the object O1 is equal to 5 meters.

Throughout the present disclosure, the term "depth map" relates to a data structure comprising information pertaining to the optical depth of the at least one object within the given real-world scene.

Optionally, the depth map is an image comprising a plurality of pixels, wherein a colour of each pixel indicates optical depth of its corresponding object. As an example, the depth map of a given real-world park scene may be a grayscale image I comprising 230400 pixels arranged as a 480×480 grid. In such an instance, the image I may be understood to be a multidimensional data structure comprising information pertaining to optical depth of at least one object within the given real-world park scene. Furthermore, in such an example, each of the 230400 pixels is associated with a single monochromatic gray colour having intensity ranging from black colour (namely, maximum intensity) to white colour (namely, minimum intensity), wherein a black coloured-pixel depicts maximum optical depth (namely, largest optical distance) of its corresponding object whilst a white coloured pixel depicts minimum optical depth (namely, smallest optical distance) of its corresponding object. For example, the given real-world park scene comprises two objects, such as a tree T and a fountain F, wherein pixels of the image I corresponding to the tree T have lesser intensity of gray colour (namely, are lighter in colour) as compared to pixels corresponding to the fountain F. Therefore, the depth map image I depicts that the tree T is closer to the means for generating the depth map or the voxel map, as compared to the fountain F.

Furthermore, throughout the present disclosure, the term "voxel map" used herein relates to a data structure comprising a plurality of three-dimensional volume elements that constitute the given real-world scene, wherein each three-dimensional volume element represents a three-dimensional region within the given real-world scene.

As mentioned previously, the processor is coupled to the at least one focusable camera and the means for generating the depth map or the voxel map. Furthermore, the processor is arranged to be communicably coupled with the display apparatus. In an embodiment, the processor is implemented by way of hardware, software, firmware or a combination of these, suitable for controlling the operation of the at least one focusable camera.

As mentioned previously, the display apparatus comprises the means for tracking the gaze direction of the user. Throughout the present disclosure, the term "means for tracking the gaze direction" used herein relates to specialized equipment for detecting and/or following a direction of gaze of the user of the display apparatus, when the user of the display apparatus views the given real-world scene. Examples of the means for detecting a gaze direction include contact lenses with sensors, cameras monitoring position of pupil of the eye, and so forth. Beneficially, an accurate detection of the gaze direction facilitates the display apparatus to closely implement gaze contingency thereon.

It is to be understood that the means for tracking the gaze direction may also be referred to as an "eye-tracker system" or a "means for detecting the gaze direction".

As mentioned previously, the processor is configured to receive, from the display apparatus, information indicative of the gaze direction of the user. It will be appreciated that such information is obtained by the means for tracking the gaze direction of the user, and thereafter, communicated from the display apparatus to the processor.

Furthermore, the processor is configured to map the gaze direction of the user to the depth map or the voxel map to determine an optical depth of a region of interest in the given real-world scene. Throughout the present disclosure, the term "region of interest" relates to a region of the given real-world scene whereat the gaze direction of the user's eyes may be focused at a given point of time. It will be appreciated that the region of interest is a fixation region within the given real-world scene. Therefore, the region of interest is a region of focus of the user's gaze within the at least one image. Furthermore, it is to be understood that the region of interest relates to a region resolved to a much greater detail as compared to other regions of given real-world scene, when the given real-world scene is viewed by a human visual system (namely, by the user's eyes).

Therefore, it will be appreciated that to implement the aforesaid mapping operation, the processor associates the gaze direction of the user with the depth map or the voxel map to determine data structure elements of the depth map or the voxel map, that substantially correspond to the region of interest in the given real-world scene. Thereafter, the processor extracts optical depth information associated with such data structure elements to determine the optical depth of the region of interest in the given real-world scene. Referring to an aforementioned example describing the given real-world park scene comprising the tree T and the fountain F, if the means for tracking gaze direction of the user indicates that the gaze direction of the user is focused towards the fountain F, the fountain F constitutes the region of interest in the given real-world park scene. Therefore, in such an example, the processor maps the gaze direction of the user to the depth map image I by determining pixels of the image I that substantially correspond to the fountain F, and extracting optical depth information associated with such pixels to determine an optical depth of the fountain F in the given real-world park scene. It is to be understood that the colour intensity of such pixels depicts depth of the fountain F. For example, the optical depth of the fountain F may be determined to be 3 meters.

Furthermore, it will be appreciated that in order to implement the aforesaid mapping operation, the depth map or the voxel map is required to be generated prior to receiving, from the display apparatus, the information indicative of the gaze direction of the user. Therefore, in one embodiment, the depth map or the voxel map are generated prior to detection of the gaze direction of the user. In another embodiment, the depth map or the voxel map are generated whilst detecting the gaze direction of the user. In yet another embodiment, the depth map or the voxel map are generated only upon detection of a change in the gaze direction of the user.

As mentioned previously, the processor is configured to control the at least one focusable camera to employ a focus length that is substantially similar to the determined optical depth of the region of interest when capturing the at least one image of the given real-world scene. In such an instance, the processor controls the at least one focusable camera to employ the focus length that allows for sharply (namely, clearly) focusing at the region of interest having the determined optical depth, when capturing the at least one image of the given real world scene. Optionally, in this regard, the processor adjusts the focus length of the at least one focusable camera in accordance with the determined optical depth of the region of interest. In such a case, the at least one focusable camera is controlled to focus on the determined optical depth when capturing the at least one image of the given real-world scene. Therefore, a sharpest possible image of the region of interest is captured.

It will be appreciated that the aforesaid controlling of the at least one focusable camera allows for accurately focusing on objects in near field of the at least one focusable camera. In such an instance, the near field of the at least one focusable camera may be defined as a region of the given real-world scene that is within a distance of 3 meters from the at least one focusable camera. Furthermore, the aforesaid controlling of the at least one focusable camera allows for accurately focusing on objects beyond the near field of the at least one focusable camera.

Beneficially, the aforesaid controlling of the at least one focusable camera allows for achieving high resolution within the at least one image of the given real-world scene, to be captured, even when the given real-world scene has sufficiently deep depth characteristics.

Furthermore, optionally, the "focus length" of the at least one focusable camera relates to a distance between the at least one controllable lens and the imaging sensor of the at least one focusable camera when the region of interest having the determined optical depth, is in focus. In such an instance, the region of interest is understood to be in focus when light emanating therefrom converges precisely at the photosensitive surface of the imaging sensor (of the at least one focusable camera). Consequently, the region of interest is captured with sharp detail, when capturing the at least one image of the given real-world scene.

Optionally, the imaging system further comprises at least one second actuator for moving the at least one controllable lens with respect to the imaging sensor of the at least one focusable camera, wherein the processor is configured to control the at least one second actuator for adjusting a location of the light emanating from the region of interest on the imaging sensor. In such an instance, the at least one second actuator is moved to adjust the focus length of the at least one focusable camera, in accordance with the optical depth of the region of interest. Optionally, the focus length employed by the at least one focusable camera increases with an increase in the determined optical depth of the region of interest. In such an instance, a width of angle of view of the at least one focusable camera reduces with increase in the focus length. Furthermore, smaller the angle of view of the at least one focusable camera, higher the magnification associated with the at least one image of the given real-world scene.

As an example, if a region of interest R1 in a given real-world scene is determined to have an optical depth D1 equal to 2 meters, the processor may control the at least one focusable camera to employ a focus length equal to 24 millimeters when capturing the at least one image of the real world scene. In such an example, if a region of interest R2 in the given real-world scene is determined to have an optical depth D2 equal to 5 meters, the processor may control the at least one focusable camera to employ a focus length equal to 70 millimeters when capturing the at least one image of the real world scene.

Optionally, the display apparatus further comprises at least one context image renderer for rendering a context image and at least one focus image renderer for rendering a focus image, and wherein the processor is further configured to:

process the at least one image to generate the context image and the focus image, the context image having a first resolution and the focus image having a second resolution, the second resolution being higher than the first resolution, wherein the focus image is to be generated from a region of the at least one image that substantially corresponds to the region of interest in the given real-world scene; and communicate the generated context image and the generated focus image to the display apparatus for rendering thereat.

It will be appreciated that the term "context image" used herein relates to a wide image of the given real-world scene, to be rendered and projected via the display apparatus. Furthermore, the term "focus image" relates to another image depicting a part (namely, a portion) of the given real-world scene, to be rendered and projected via the display apparatus. Therefore, it is to be understood that the focus image is dimensionally smaller than the context image. Furthermore, it is to be understood that the rendered focus image is typically projected on and around the fovea of the user's eyes, whereas the rendered context image is projected on the retina of the user's eyes, of which the fovea is just a small part. Moreover, the rendered context and focus images collectively constitute a stereoscopic image of the given real-world scene to be presented to the user of the display apparatus. Such a stereoscopic image of the given real-world scene constitutes a visual scene of the simulated environment (for example, such as the virtual reality environment) and may also be referred to as a "virtual reality image".

Optionally, an angular width of the projection of the rendered context image ranges from 40 degrees to 220 degrees, whereas an angular width of the projection of the rendered focus image ranges from 5 degrees to 60 degrees. Throughout the present disclosure, the term "angular width" refers to an angular width of a given projection as seen from the user's eyes, when the display apparatus is worn by the user. It will be appreciated that the angular width of the projection of the rendered context image is larger than the angular width of the projection of the rendered focus image. This may be attributed to the fact that the rendered focus image is typically projected on and around the fovea of the user's eyes, whereas the rendered context image is projected on the retina of the user's eyes.

Throughout the present disclosure, the term "context image renderer" relates to equipment configured to facilitate rendering of the context image, whereas the term "focus image renderer" relates to equipment configured to facilitate rendering of the focus image. Optionally, the context image renderer and/or the focus image renderer are implemented by way of at least one projector and a projection screen associated therewith. Optionally, the context image renderer is implemented by way of at least one context display configured to emit the projection of the rendered context image therefrom. Similarly, optionally, the focus image renderer is implemented by way of at least one focus display configured to emit the projection of the rendered focus image therefrom.

It will be appreciated that the processor is configured to process the at least one image to generate the context image and the focus image that collectively constitute the image of the simulated environment to be presented to the user of the display apparatus. Furthermore, the second resolution is higher than the first resolution since the focus image substantially corresponds to the region of interest in the given real-world scene whereat the user's gaze is focused, whereas the context image substantially corresponds to a remaining region of the given real-world scene. Moreover, the processor communicates the generated context image and the focus image to the at least one context image renderer and the at least one focus image renderer respectively, for rendering at the display apparatus.

Furthermore, optionally, the processor is configured to crop the at least one image to generate the focus image. In such a case, the cropping is implemented in a manner that the focus image depicts (namely, visually represents) the region of the at least one image that substantially corresponds to the region of interest in the given real-world scene. More optionally, the processor is configured to crop the at least one image to a predefined shape when generating the focus image. More optionally, the predefined shape is determined according to a shape of the region of the at least one image that substantially corresponds to the region of interest in the given real-world scene. Examples of the predefined shape include, but are not limited to, a circle, a polygon, and an ellipse. It will be appreciated that the aforesaid cropping of the at least one image beneficially allows for a reduction in size thereof, and consequently, a reduction in transmission bandwidth required to communicate the generated focus image from the reduced at least one image, to the display apparatus.

Furthermore, optionally, when processing the at least one image, the processor is configured to adjust a blur effect associated with at least one object that is visible in the at least one image and lies outside the region of interest in the given real-world scene, based upon an optical depth of the at least one object. In such an instance, the optical depth of the at least one object may be determined using the generated depth map or the voxel map of the given real-world scene. Throughout the present disclosure, the "blur effect" (namely, bokeh) relates to an aesthetic unfocus (namely, blurring, softness, or lack of clarity) associated with the at least one object that is visible in the at least one image and lies outside the region of interest in the given real-world scene. Such a blur effect relates to a reduction in sharpness of the at least one object lying outside the region of interest, as compared to sharpness of the region of interest.

Optionally, the blur effect associated with the at least one object is adjusted in a manner that the blur effect (namely, a decrease in sharpness) increases with increase in optical depth between the at least one object and the region of interest. In this regard, the optical depth between the at least one object and the region of interest is to be understood as an absolute value of difference between the optical depth of the at least one object and the determined optical depth of the region of interest. Furthermore, optionally, the blur effect increases gradually with increase in the optical depth between the at least one object and the region of interest. In such an instance, the blur effect is adjusted in a manner that the increase in the blur effect is imperceptible under normal viewing conditions. It will be appreciated that such gradual adjustment of the blur effect associated with the at least one object allows for the blur effect to be implemented in a continuous manner, thereby, enhancing realism within the captured at least one image of the given real-world scene.

As an example, the determined optical depth of a region of interest R1 in the given real-world scene is equal to 4 meters, an optical depth of an object X is equal to 6 meters, and an optical depth of an object Y is equal to 11 meters. In such an example, optical depth between object X and the region of interest R1 is equal to 2 meters whereas optical depth between object Y and the region of interest R1 is equal to 7 meters. Therefore, in such an example, the processor is configured to adjust blur effects associated with the objects X and Y in a manner that the blur effect associated with the object X is lesser than the blur effect associated with the object Y. In other words, unfocus (namely, blurring) of the object X is lesser than unfocus of the object Y. Furthermore, the aforesaid increase in blur effect may be implemented gradually, in a continuous manner, for enhancing realism within the captured at least one image of the given real-world scene.

It will be appreciated that the aforementioned adjustment of the blur effect allows for closely emulating focusing properties of the human visual system.

Optionally, when processing the at least one image, the processor is configured to overlay the at least one image with at least one virtual object, and associate an optical depth with the at least one virtual object. In such an instance, if the gaze direction of the user is detected to be focused towards the at least one virtual object, the processor controls the at least one focusable camera to employ the focus length that is substantially similar to the optical depth associated with the at least one virtual object. Therefore, the processor need not implement the step of mapping the gaze direction of the user to the depth map or the voxel map to determine the optical depth of the at least one virtual object, thereby, reducing an amount of processing required prior to capturing the at least one image of the given real-world scene.

It will be appreciated that association of the optical depth with the at least one virtual object beneficially allows for enhancing realism whilst overlaying the at least on virtual object on the at least one image. Optionally, the optical depth associated with the at least one virtual object is equal to the optical depth of the region of interest in the given real-world scene. Alternatively, optionally, the optical depth associated with the at least one virtual object is unequal to the optical depth of the region of interest in the given real-world scene. Examples of the at least one virtual object include, but are not limited to, virtual navigation tools, virtual gadgets, virtual messages, virtual entities, and virtual media.

Furthermore, it will be appreciated that the context and focus images generated from the at least one image, having the at least one virtual object overlaid thereon, collectively constitute a stereoscopic image of the given real-world scene having the at least one virtual object. Such a stereoscopic image of the given real-world scene having the at least one virtual object constitutes a visual scene of the simulated environment (for example, such as the augmented reality environment) and may also be referred to as an "augmented reality image".

Optionally, the imaging system comprises at least one fixed focus camera for capturing the at least one image of the given real-world scene, the means for generating the depth map or the voxel map of the given real-world scene, and the processor coupled to the at least one fixed focus camera and the means for generating the depth map or the voxel map, wherein the processor is arranged to be communicably coupled to the display apparatus, further wherein the processor is configured to receive, from the display apparatus, the information indicative of the gaze direction of the user;

map the gaze direction of the user to the depth map or the voxel map to determine the optical depth of the region of interest in the given real-world scene, and adjust the blur effect associated with the at least one object that is visible in the at least one image and lies outside the region of interest in the given real-world scene, based upon the depth map or the voxel map, when capturing the at least one image of the given real-world scene.

In such an instance, the term "at least one fixed focus camera" used herein relates to equipment that is operable to employ a fixed focus length whilst capturing the at least one image of the given real-world scene. Optionally, the at least one fixed focus camera has a substantially large depth of field associated therewith. It will be appreciated that even upon employing the at least one fixed focus camera, the imaging system described herein is operable to programmatically (namely, via programming of the processor) adjust and implement the blur effect associated with the at least one object that lies outside the region of interest in the given real-world scene, thereby, emulating the focusing properties of the human visual system. Consequently, when such at least one image is employed to create a video stream of the simulated environment to be presented to the user of the display apparatus, the video stream of the simulated environment includes the aforesaid blur effect, thereby, enhancing the user's experience of the simulated environment.

The present disclosure also relates to the method as described above. Various embodiments and variants disclosed above apply mutatis mutandis to the method.

DETAILED DESCRIPTION OF THE DRAWINGS

Referring to FIG. 1, illustrated is a block diagram of architectures of an imaging system 102 and a display apparatus 104, in accordance with an embodiment of the present disclosure. The imaging system 102 comprises at least one focusable camera 106 for capturing at least one image of a given real-world scene, means for generating a depth map or a voxel map 108 of the given real-world scene, and a processor 110 coupled to the at least one focusable camera 106 and the means for generating the depth map or the voxel map 108. The processor 110 is arranged to be communicably coupled with the display apparatus 104, the display apparatus 104 comprising means for tracking a gaze direction 112 of a user. The processor 110 is configured to receive, from the display apparatus 104, information indicative of the gaze direction of the user; map the gaze direction of the user to the depth map or the voxel map to determine an optical depth of a region of interest in the given real-world scene; and control the at least one focusable camera 106 to employ a focus length that is substantially similar to the determined optical depth of the region of interest when capturing the at least one image of the given real-world scene.

Figure 2:
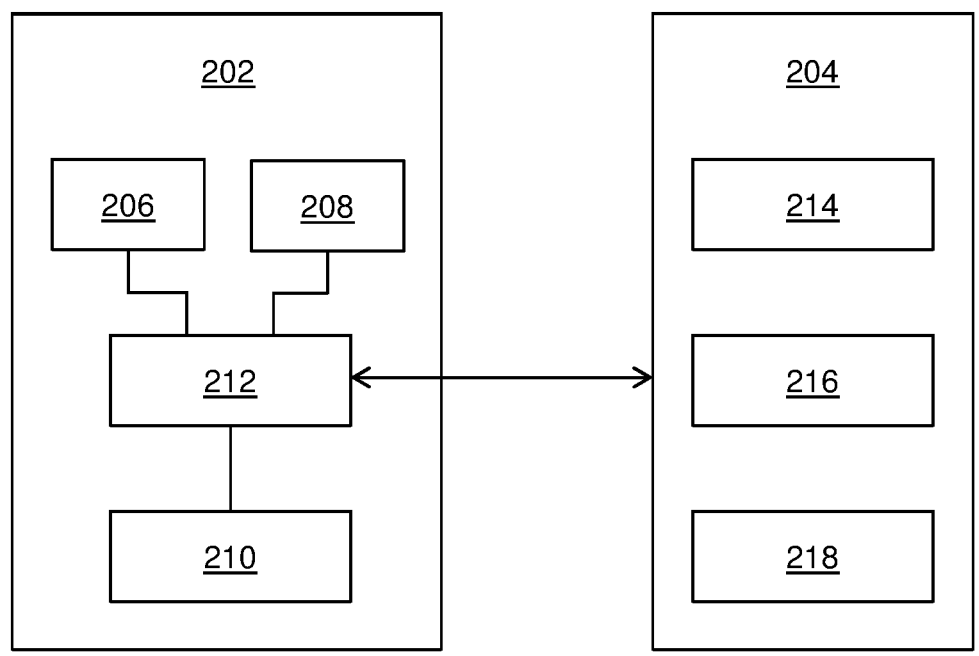

Referring to FIG. 2, illustrated is a block diagram of architectures of an imaging system 202 and a display apparatus 204, in accordance with another embodiment of the present disclosure. The imaging system 202 comprises at least one focusable camera, depicted as focusable cameras 206 and 208, for capturing at least one image of a given real-world scene, means for generating a depth map or a voxel map 210 of the given real-world scene, and a processor 212 coupled to the at least one focusable camera 206-208 and the means for generating the depth map or the voxel map 210. As shown in the exemplary imaging system 202, optionally, the at least one focusable camera comprises a first focusable camera 206 substantially aligned with a left eye of a user and a second focusable camera 208 substantially aligned with a right eye of the user. The processor 212 is arranged to be communicably coupled with the display apparatus 204, the display apparatus 204 comprising means for tracking a gaze direction 214 of a user. Furthermore, optionally, the exemplary display apparatus 204 comprises at least one context image renderer 216 for rendering a context image and at least one focus image renderer 218 for rendering a focus image.

Figure 3:
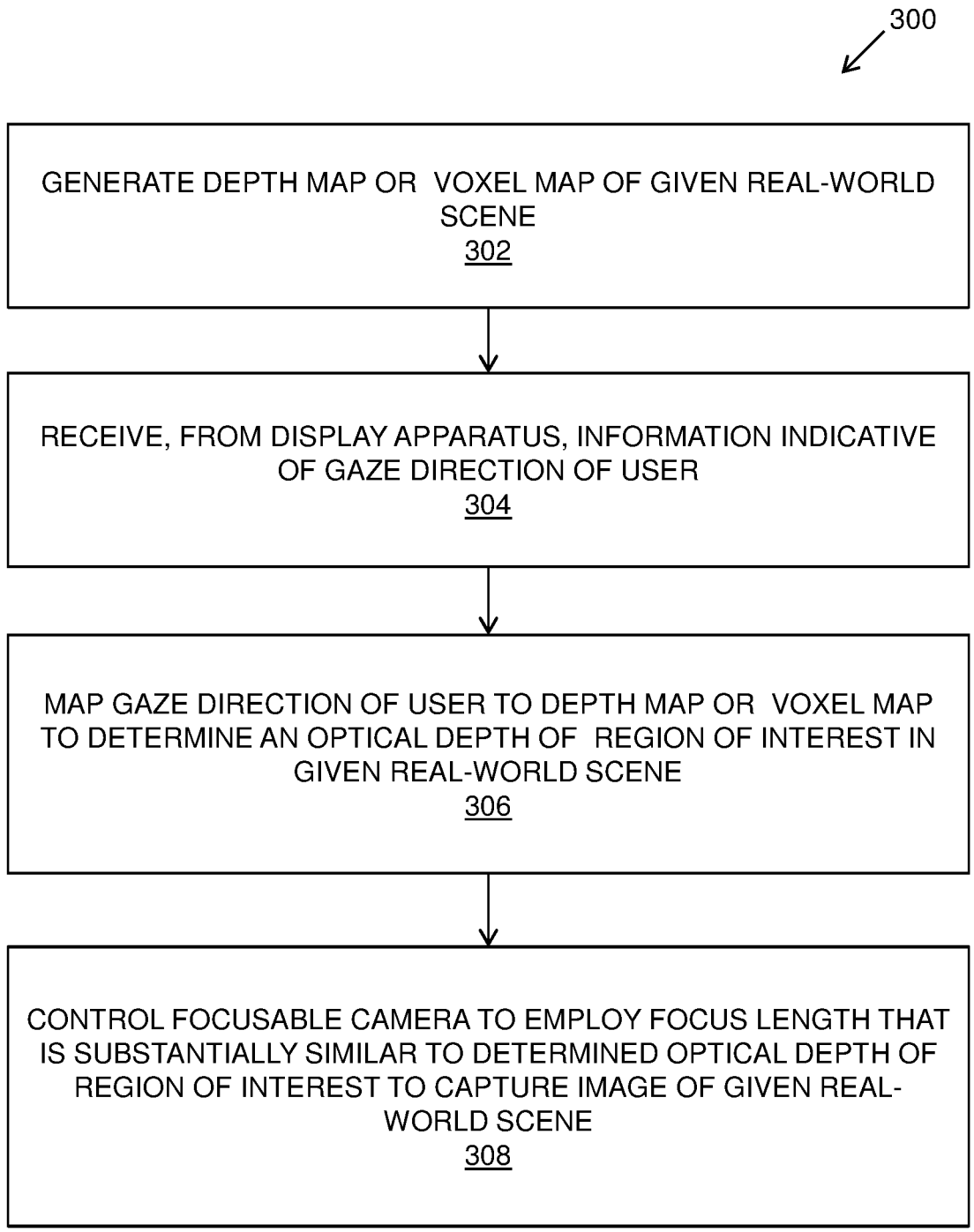
FIG. 3 illustrates steps of a method of producing images for a display apparatus, via an imaging system, in accordance with an embodiment of the present disclosure.

Referring to FIG. 3, illustrated are steps of a method 300 of producing images for a display apparatus (for example, such as the display apparatus 104 of FIG. 1), via an imaging system (for example, such as the imaging system 102 of FIG. 1). At step 302, a depth map or a voxel map of a given real-world scene is generated. At step 304, information indicative of a gaze direction of a user is received from the display apparatus. At step 306, the gaze direction of the user is mapped to the depth map or the voxel map to determine an optical depth of a region of interest in the given real-world scene. At step 308, at least one focusable camera is controlled to employ a focus length that is substantially similar to the determined optical depth of the region of interest to capture at least one image of the given real-world scene.

The steps 302 to 308 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

What is claimed is:

1. An imaging system comprising:
   at least one focusable camera for capturing at least one image of a given real-world scene;
   means for generating a depth map or a voxel map of the given real-world scene, the depth map or voxel map comprising a grid of pixels, each pixel having a monochromatic gray color indicating an optical depth of at least one object within the real world scene; and
   a processor coupled to the at least one focusable camera and the means for generating the depth map or the voxel map, wherein the processor is arranged to be communicably coupled with a display apparatus, the display apparatus comprising means for tracking a gaze direction of a user, wherein the processor is configured to:
- receive, from the display apparatus, information indicative of the gaze direction of the user;
- map the gaze direction of the user to the depth map or the voxel map to determine an optical depth of a region of interest in the given real-world scene; and
- adjust a blur effect associated with at least one object that is visible in the at least one image and lies outside the region of interest in the given real-world scene, based upon an optical depth between the at least one object and the region of interest;

wherein the display apparatus further comprises at least one context image renderer for rendering a context image and at least one focus image renderer for rendering a focus image, and wherein the processor is further configured to:
- process the at least one image to generate the context image and the focus image, the context image having a first resolution and the focus image having a second resolution, the second resolution being higher than the first resolution, wherein the focus image is to be generated from a region of the at least one image that substantially corresponds to the region of interest in the give real-world scene; and
- communicate the generated context image and the generated focus image to the display apparatus for rendering thereat;

wherein to generate the focus image, the processor is further configured to crop the focus image to a predefined shape determined according to a shape of the region of interest in the real-world scene.

2. The imaging system of claim 1, wherein, when processing the at least one image, the processor is configured to:
- overlay the at least one image with at least one virtual object; and
- associate an optical depth with the at least one virtual object.

3. The imaging system of claim 1, wherein the imaging system is integrated with the display apparatus.

4. The imaging system of claim 1, wherein the at least one focusable camera comprises a first focusable camera substantially aligned with a left eye of the user and a second focusable camera substantially aligned with a right eye of the user.

5. A method of producing images for a display apparatus, via an imaging system comprising at least one focusable camera and means for generating a depth map or a voxel map of a given real-world scene, the imaging system being communicably coupled with the display apparatus, the method comprising:
- generating the depth map or the voxel map of the given real-world scene, the depth map or voxel map comprising a grid of pixels, each pixel having a monochromatic gray color indicating an optical depth of at least one object within the real world scene;
- receiving, from the display apparatus, information indicative of a gaze direction of a user;
- mapping the gaze direction of the user to the depth map or the voxel map to determine an optical depth of a region of interest in the given real-world scene;
- adjusting a blur effect associated with at least one object that is visible in the at least one image and lies outside the region of interest in the given real-world scene, based upon an optical depth of the at least one object;
- processing the at least one image to generate a context image and a focus image, the context image having a first resolution and the focus image having a second resolution, the second resolution being higher than the first resolution, wherein the focus image is generated from a region of the at least one image that substantially corresponds to the region of interest in the given real-world scene; and
- communicating the generated context image and the generated focus image to the display apparatus for rendering thereat;

wherein the focus image is generated from a region of the at least one image that substantially corresponds to the region of interest by cropping the focus image to a predefined shape determined according to a shape of the region of interest.

6. The method of claim 5, wherein the processing of the at least one image comprises:
- overlaying the at least one image with at least one virtual object; and
- associating an optical depth with the at least one virtual object.

7. The method of claim 5, wherein the at least one focusable camera comprises a first focusable camera and a second focusable camera, and wherein the method further comprises substantially aligning the first focusable camera and the second focusable camera with a left eye and a right eye of the user, respectively.

* * * * *